United States Patent Office 2,790,311
Patented Apr. 30, 1957

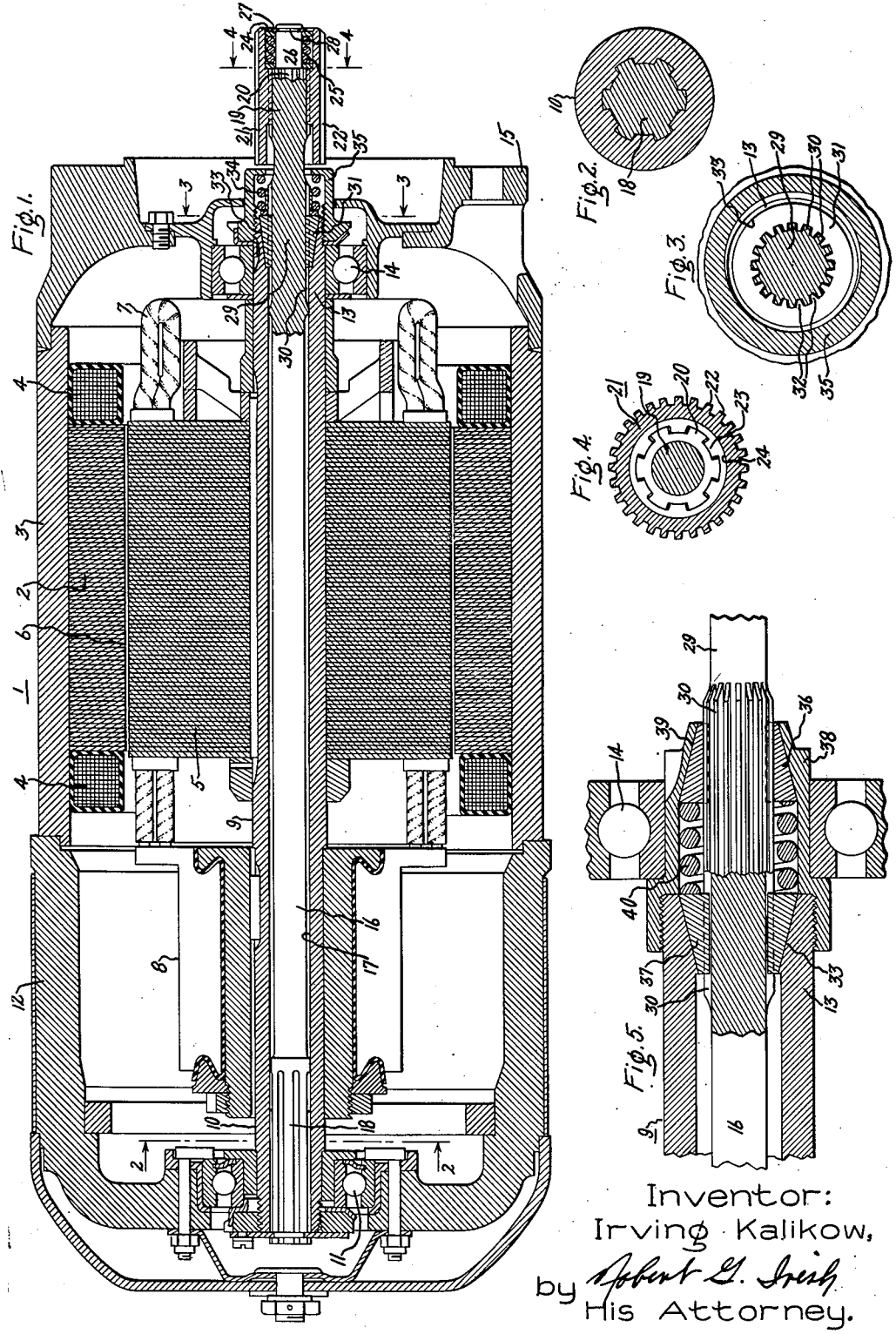

2,790,311

DRIVING MECHANISM

Irving Kalikow, Swampscott, Mass., assignor to General Electric Company, a corporation of New York Continuation of application Serial No. 314,551, October 13, 1952. This application December 29, 1955, Serial No. 556,112

5 Claims. (Cl. 64—1)

This application is a continuation of application Serial No. 314,551 filed October 13, 1952 for Driving Mechanism, now abandoned.

This invention relates to driving mechanisms and more particularly to mechanism for driving dynamoelectric machines such as aircraft generators.

Reciprocating engines, such as piston driven aircraft engines, inherently have a considerable residue of torsional vibration. It is therefore necessary to provide a special driving connection whenever a relatively large rotating mass, such as an aircraft generator, is removably coupled to the engine. It has been found undesirable to utilize a direct, rigid coupling between the generator and the engine, such as a solid, heavy armature shaft splined at one end for engagement with the engine shaft since the necessity for removability of the generator requires that some clearance will always be present at the splined joint faces and this clearance, however small, allows shock waves to be built up due to the inconsistent nature of the torsional drive. These shock waves can cause serious damage to the armature or shaft in a very short time.

In order to absorb this destructive torsional vibration produced by the reciprocating prime mover, a driving connection which has been favored in the past consists of a flexible inner shaft or torque rod placed within an outer hollow or quill shaft in which the heavy armature is fitted. One end of the inner shaft or torque rod has a splined connection to the engine while the other is firmly attached to the remote end of the quill shaft. This arrangement thus provides a spring-drive system which can absorb destructive torsional vibrations produced by the engine.

While the inner shaft-quill type of drive affords good shock absorbing means for rotatably connecting the generator to the engine, it has one serious drawback; the system has a critical frequency which, if approached even closely by the right torsional vibration frequency, will set the mass-spring shaft combination into very large torsional oscillation.

Heretofore, the common way to prevent such destructive oscillations from occurring has been to add a friction damper to the inner shaft-quill arrangement. This damper was attached at the engine drive end near the splined connection with the engine in such a manner that any relative motion between the inner and outer shafts was resisted by frictional means. In order to be effective, however, this damper had to develop a relatively high amount of friction and had to be arranged in a relatively small amount of space. Even with optimum designing, this damper weighed a considerable amount and added appreciably to the over-all cost of the machine. In addition to its weight and cost penalties, engine-generator combinations equipped with this arrangement are subject to frequent operational difficulties resulting from the severe imposed vibration forces.

In order to provide a drive which would not only absorb the torsional vibration produced by the engine, but also prevent the destructive torsional oscillations, the clearance-type drive was provided. This arrangement, which is completely described and claimed in my co-pending application, Serial No. 142,053, filed February 2, 1950, now Patent No. 2,658,361 issued November 10, 1953, and assigned to the assignee of the present application, provided an inner shaft formed in two parts; one comprising an engine engaging spline and the other the flexible inner shaft. The engaging spline is splined to the free end of the inner shaft with the splined connection being constructed so that a relatively large torsional clearance obtains between the two members. These two members, while loose torsionally, otherwise fit together so as to present the appearance of a single splined inner shaft. This torsional looseness limits and prevents the destructive oscillations which would normally appear when the mass-spring system is excited at or near its critical frequency. It has been found that the provision of this clearance at the drive end eliminates in most cases the first critical frequency motor vibration.

For transient conditions, especially during starting and stopping of the engine, the clearance-type drive may not in all cases be adequate in its simple form. It has been found that in the case of an engine backfire, or the oscillation occasioned when the engine is stopped, severe shear loading is imposed on the shaft. These shear loads may also be aggravated by the fact that the clearance provided in the splined connection allows independent velocities to be built up in the armature or the engine which are suddenly arrested or reversed during a backfire or sudden stoppage. This problem could be solved by increasing the shear section, however this adds expense and weight and furthermore does not allow proper drive protection. It is therefore desirable to provide a driving mechanism which will not only absorb torsional vibration of a reciprocating engine and dampen destructive oscillations, but which will also absorb the stresses imposed under transient conditions.

An object of this invention is therefore to provide an improved driving mechanism incorporating the desirable features enumerated above.

Further objects and advantages of this invention will become apparent and the invention will be better understood by reference to the following description and the accompanying drawing, and the features of novelty which characterize this invention will be pointed out with particularity in the claims annexed to and forming a part of this application.

In accordance with this invention, a small-low inertia friction cone is added to the inner shaft adjacent the free end of the outer quill shaft. This cone is spring-loaded and frictionally engages a corresponding conical shaped surface on the quill shaft thus preventing the armature from applying exceptional stresses on the splined connection with the engine under unusual transient conditions. This construction retains all of the advantages of the clearance-type drive and in addition, cushions the shear stresses encountered during backfires or sudden stoppage of the engine.

In the drawing, Fig. 1 is a side elevational view, partly in section, illustrating the improved driving mechanism of this invention;

Fig. 2 is a cross sectional view taken along the line 2—2 of Fig. 1;

Fig. 3 is a cross sectional view taken along the line 3—3 of Fig. 1;

Fig. 4 is a cross sectional view taken along the line 4—4 of Fig. 1; and

Fig. 5 is a fragmentary cross sectional view illustrating a modification of this invention.

Referring now to Figs. 1 through 4 inclusive, there is shown an aircraft generator generally identified as 1 having a suitable stator member 2 mounted within a shell 3 and having suitable poles (not shown) on which field exciting windings 4 are arranged. An armature 5 is arranged within the bore 6 of stator member 2 and has windings 7 arranged in suitable slots (not shown) in its outer periphery. Windings 7 are then connected to the bars of commutator 8 which in turn are contacted by suitable brushes (not shown). Armature core 5 and commutator 8 are both mounted on an elongated hollow quill shaft 9 having one end 10 rotatably supported by a suitable bearing 11 mounted in end shield 12 and having its other end 13 rotatably supported by a suitable bearing 14 mounted in end shield 15.

The quill shaft 9 on which armature core 5 and commutator 8 are mounted is driven by a suitable prime mover (not shown) such as a piston-driven aircraft engine, through an inner shaft or torque rod 16 concentrically arranged within the bore 17 of the quill shaft 9. The end 18 of torque rod 16 is rigidly secured to the end 10 of quill shaft 9 by a splined connection as best seen in Fig. 2. The other end 19 of torque rod 16 extends beyond end 13 of quill shaft 9 and has a plurality of external splines 20 formed thereon. A coupling member 21 is arranged over end 19 of torque rod 16 and has a plurality of external splines 22 formed on its external surface for engagement with suitable mating splines on the prime mover shaft (not shown). The internal surface of coupling member 21 has a plurality of internal splines 23 formed thereon mating with the external splines 20 of end 19 of torque rod 16, as best shown in Fig. 4. As described in the aforementioned Patent No. 2,658,361, a torsional clearance is provided between the external splines 20 on the end 19 of torque rod 16 and the internal splines 23 on coupling member 21. This torsional clearance prevents the destructive oscillations produced when the frequency of the torsional vibration of the engine passes through the critical frequency of the mass-spring shaft combination. In order to retain coupling member 21 on the shaft extension 19 of torque rod 16, a recess 24 is formed in the end of coupling member 21 in which coil spring 25 is positioned surrounding shaft extension 26 which extends beyond the splined portion of extension 19. Coil spring 25 is retained in position by a suitable snap ring 27 positioned in a groove 28 formed in the end of shaft extension 26.

In order to prevent the severe shear loading occasioned under transient conditions, the portion 29 of torque rod 16 adjacent end 13 of quill shaft 9 has a plurality of external splines 30 formed thereon and a small conical shaped friction dampening member 31 is provided having internal splines 32 mating with external splines 30 of shaft portion 29. Here to, it may be desirable to provide a small torsional clearance between external splines 30 of shaft portion and internal splines 32 of conical friction damper member 31 as best seen in Fig. 3. Friction damping member 31 is biased into frictional engagement with a mating conical friction member provided with a cooperating surface 33 secured to or formed in the inner surface of end 13 of quill shaft 9 by a suitable coil spring 34 surrounding shaft portion 29. Spring 34 is arranged between conical frictional damping member 31 and a cap member 35 which threadingly engages the outer surface of end 13 of quill shaft 9.

It has been found that this friction damping arrangement, by virtue of its low inertia, which is much less than conventional drives, substantially reduces the shock loading on the engine and shaft splines far below that experienced in other drives. In addition, the torsional clearance between the splines 30 on shaft portion 29 and internal splines 32 on friction damper 31 permits the inner shaft or torque rod 16 to oscillate slightly under steady state operating conditions without evidencing spline wear at the cone engaging teeth. The combination of the clearance-type drive provided by the coupling member 21 and the conical frictional damping member 31 produces a vibration operating pattern far smoother than that found in drives employing either the clearance-type construction or the frictional damping construction alone. The clearance-type drive substantially eliminates the first critical vibration and the cone friction eliminates additional vibration in the higher frequencies. Furthermore, the frictional cone adds a safety factor in operation where sudden stopping or engine backfires occur. It also provides a positive drive of some magnitude thus aiding in preventing fracture of torque rod 16 upon sudden accelerations of the engine of a non-vibratory nature and is a positive damping force should violent sudden oscillations be imposed upon the system greater than the steady state vibration the clearance shaft was designed for.

For example, if the torsional clearance between splines 20 of torque rod 16 and the splines 23 of coupling member 21 is designed for a maximum engine torsional vibration of, say, 1° and an extraordinary violent engine torsional vibration of, say, 2° is encountered at critical frequency, the friction member 31 will provide a damping force to augment the damping action of the torsional clearance between splines 20 and splines 23. Stated in another way, the combination of the clearance type drive with friction member 31 permits the use of a smaller torsional clearance determined by steady-state, or usual, conditions rather than a larger torsional clearance determined by unusually violent oscillations which may seldom be encountered.

Referring now to Fig. 5 in which like elements are indicated by like reference numerals, it is again seen that external splines 30 are formed on portion 29 of torque rod 16 adjacent end 13 of quill shaft 9. Here, however, two opposed and spaced apart conical friction damping members 36 and 37 are provided each having internal splines respectively mating with the external splines 30. Conical surface 33 is again formed in the inner surface of end 13 of quill shaft 9 while cup member 38 threadingly engages the external surface of end 13 of quill shaft 9 and has another conical surface 39 formed at its end remote from conical surface 33. It will be seen that a coil spring 40 surrounds splines 30 of shaft portion 29 and biases conical frictional damping members 36 and 37 apart into frictional engagement with their respective conical surfaces 33 and 39.

It will now be readily seen that this invention provides an improved driving mechanism characterized by its elimination of torsional vibration, critical frequency vibrations, and unusual stresses encountered under transient conditions.

While I have shown and described particular embodiments of this invention, further modifications and improvements will occur to those skilled in the art. I desire it to be understood therefore this invention is not limited to the particular form shown and I intend in the appended claims to cover all modifications which do not depart from the spirit and scope of this invention.

What I claim as new and desire to secure by Letters Patent in the United States is:

1. A driving mechanism for a rotating mass subject to torsional vibrations comprising an elongated hollow driven shaft, an elongated torque rod arranged concentrically within said driven shaft and having a rigid connection with one end thereof, said torque rod having a portion extending beyond the other end of said driven shaft, a coupling member adapted to be connected to a source of driving power and having a splined connection with said torque rod extending portion with the mating splines thereof providing a large torsional clearance effective to provide limited relative rotation of said coupling member with respect to said torque rod to momentarily disconnect said torque rod from said coupling member to limit the amplitude of the torsional vibrations of said mass, and a friction damping member having a splined connection with said torque rod adjacent said other end of said driven shaft and frictionally engaging said driven shaft with the mating splines thereof having a small torsional clearance to effect limited relative rotation of said damping member with respect to said torque rod to provide for limited undamped oscillations of said torque rod under steady-state operating conditions.

2. A driving mechanism for a rotating mass subject to torsional vibrations comprising an elongated hollow driven shaft, an elongated torque rod arranged concentrically within said driven shaft and having a rigid connection with one end thereof, said torque rod having a portion extending beyond the other end of said driven shaft, a coupling member adapted to be connected to a source of driving power and having a splined connection with said torque rod projecting portion with the mating splines thereof providing a large torsional clearance effective to provide limited relative rotation of said coupling member with respect to said torque rod to limit the amplitude of torsional vibrations of said driven shaft, a pair of spaced apart conical shaped friction damping members respectively having splined connections with said torque rod adjacent said other end of said driven shaft, said driven shaft having a pair of spaced apart conical shaped friction surfaces respectively formed adjacent said other end thereof, and spring means biasing said conical damping members apart and respectively into frictional engagement with said friction surfaces.

3. A driving mechanism for a rotating mass adapted to be driven by a power source subject to torsional vibrations comprising, a hollow driven shaft of substantially the same diameter throughout arranged for supporting said mass, a resilient torque rod positioned within said driven shaft arranged for rigid connection therewith at one end and terminating at its other end in a portion extending beyond said driven shaft, a coupling member adapted for connection to said power source, a mating splined connection between said coupling member and said torque rod extending portion with the mating splines thereof providing a large torsional clearance operable to provide limited relative rotation therebetween for limiting the amplitude of vibration of said rotating mass to a predetermined maximum under normal torsional vibration conditons of said power source, conical friction means positioned within said other end of said hollow driven shaft and having a splined connection with said torque rod, a cooperating friction surface formed on the inner peripheral portion of said driven shaft arranged for contact by a mating surface provided on said conical friction means, and resilient means biasing said conical friction means into engagement with said cooperating surface to provide a positive frictional force upon relative movement of said driven shaft and torque rod resulting from violent torsional vibration conditions of said power source thereby to augment the damping action of said torsional clearance.

4. A driving mechanism for a rotating mass subject to torsional vibration comprising an elongated hollow driven shaft, an elongated torque rod arranged concentrically within said driven shaft and having a rigid connection with one end thereof, said torque rod having a portion extending beyond the other end of said driven shaft, a coupling member adapted to be connected to a source of driving power and having a splined connection with said torque rod extending portion with the mating splines thereof providing a large torsional clearance effective to provide limited relative rotation of said coupling member with respect to said torque rod to momentarily disconnect said torque rod from said coupling member to limit the amplitude of the torsional vibrations of said mass, and a friction damping member positioned within said hollow driven shaft and having a splined connection with said torque rod adjacent said other end of said driven shaft, said friction damping member being arranged to frictionally engage said driven shaft to provide a positive frictional force upon relative movement of said driven shaft and said torque rod thereby to augment the damping action of said torsional clearance.

5. A driving mechanism for a rotating mass adapted to be driven by an engine subject to torsional vibrations comprising a hollow driven shaft of substantially the same diameter throughout arranged for supporting said rotating mass, a resilient torque rod positioned concentrically within said driven shaft and having means at one end coupling together said hollow shaft and said torque rod, means on the other end of said torque rod coupling said torque rod to said engine, one of said coupling means comprising a splined connection with the mating splines thereof providing a large torsional clearance operable to provide limited relative rotation therebetween for momentarily disconnecting said rotating mass from said engine and thereby limiting the amplitude of vibration of said rotating mass to a predetermined maximum under normal torsional vibration of said engine, a conical friction member having a friction surface positioned within said hollow driven shaft and arranged for rotation with said torque rod, a cooperating friction surface provided on the inner peripheral portion of said driven shaft, and means biasing said conical member in a direction causing engagement of said friction surfaces for providing a positive friction force upon relative rotation of said driven shaft and torque rod resulting from violent torsional vibration conditions of said engine, said positive friction force being effective to augment the damping action of said torsional clearance.

References Cited in the file of this patent
UNITED STATES PATENTS

| | | |
|---|---|---|
| 2,346,432 | Heintz | Apr. 11, 1944 |
| 2,437,954 | Havill | Mar. 16, 1948 |
| 2,658,361 | Kalikow | Nov. 10, 1953 |
| 2,734,359 | Mulheim et al. | Feb. 14, 1956 |